(12) United States Patent
Chang et al.

(10) Patent No.: US 8,031,713 B2
(45) Date of Patent: Oct. 4, 2011

(54) GENERAL MULTI-LINK INTERFACE FOR NETWORKING ENVIRONMENTS

(75) Inventors: Fu-Chung Chang, Rhinebech, NY (US); Carol L. Soto, Highland, NY (US); Jian Xiao, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 12/021,900

(22) Filed: Jan. 29, 2008

(65) Prior Publication Data
US 2009/0190495 A1 Jul. 30, 2009

(51) Int. Cl.
H04L 12/28 (2006.01)
H04L 12/56 (2006.01)
H04J 3/16 (2006.01)

(52) U.S. Cl. .................... 370/392; 370/395.54; 370/419; 370/469

(58) Field of Classification Search .......................... None
See application file for complete search history.

(56) References Cited

U.S. PATENT DOCUMENTS

| | | | |
|---|---|---|---|
| 5,761,507 A | 6/1998 | Govett | |
| 6,101,188 A * | 8/2000 | Sekine et al. | 370/401 |
| 6,295,276 B1 | 9/2001 | Datta et al. | |
| 6,901,072 B1 * | 5/2005 | Wong | 370/389 |
| 7,075,895 B1 | 7/2006 | Hanam | |
| 7,145,866 B1 * | 12/2006 | Ting et al. | 370/225 |
| 2003/0140124 A1 * | 7/2003 | Burns | 709/220 |
| 2005/0152355 A1 | 7/2005 | Henriques | |
| 2006/0045098 A1 | 3/2006 | Krause | |
| 2006/0268863 A1 | 11/2006 | Chang et al. | |
| 2006/0274752 A1 * | 12/2006 | Jain et al. | 370/392 |

OTHER PUBLICATIONS

Hsueh, et al., "Boosting Ethernet Using Regular Switching Hubs," Journal of Information Science and Engineering 22, pp. 721-734 (2006).
Lin, et al., "BondingPlus: Real-Time Message Channel in Linux Ethernet Environment Using Regular Switching Hub," Lecture Notes in Computer Science (ISSN 0302-9743), 2003.
Parr, "Address Resolution for an Intelligent Filtering Bridge Runnng on a Subnetted Ethernet System," ACM SIGCOMM Computer Communication Review, vol. 17, No. 3, pp. 48-70, Jul./Aug. 1987.
Glesner, et al., "Reconfigurable Platforms for Ubiquitous Computing", ACM International Conference on Computing Frontiers, Apr. 2004,pp. 377-389, Ischia IT.
Park, et al., "Information Systems Interoperability: What Lies Beneath?", ACM Transactions on Information Systems, vol. 22, No. 4, Oct. 2004, pp. 595-632, New York, US.
Jiang, et al., "VIOLIN: Virtual Internetworking on Overlay Infrastructure", CS Technical Report CSD TR 03-027, Purdue University, Jul. 2003.

* cited by examiner

*Primary Examiner* — Daniel J Ryman
*Assistant Examiner* — Cassandra Decker
(74) *Attorney, Agent, or Firm* — Mitch Harris, Atty at Law, LLC; Andrew M. Harris; Matthew W. Baca

(57) ABSTRACT

A method, information processing system, and computer readable medium manage a plurality of network interfaces. A data packet is accepted at a pseudo network interface. The pseudo network interface manages a plurality of underlying physical network interfaces. The pseudo network interface selects selected physical network interface from the plurality of physical network interfaces for outputting the data packet. The data packet is modified to include a hardware address associated with the selected physical network interface in response to the selecting. The data packet that has been modified is forwarded to the physical network interface that has been selected.

12 Claims, 7 Drawing Sheets

GENERAL MULTI-LINK INTERFACE FOR NETWORKING ENVIRONMENTS

This invention was made with Government support under Agreement No. HR0011-07-9-002 awarded by DARPA. The Government has certain rights in the invention.

FIELD OF THE INVENTION

The present invention generally relates to the field of networking, and more particularly relates to managing communications nodes that comprise multiple communications network interface adapters.

BACKGROUND OF THE INVENTION

Many networking environments employ multiple communications network adapters or multi-port network adapters. These environments are able to utilize various technologies to exploit the multiple physical links created by the multiple adapters, thereby achieving high network availability, reliability, and performance. Among these technologies are Cisco's EtherChannel, the industrial standard 802.3ad, and Ethernet Bonding for LINUX. One major drawback of these technologies is that they are often designed and implemented specifically for Ethernet. As the emergence of new interconnect technologies such as InfiniBand starts to effect the replacement of the Ethernet infrastructure, the existing Ethernet only solutions are not sufficient. Additionally, these technologies are currently only implemented for a single adapter type, such as Ethernet. Therefore, the network environment generally cannot comprise network adapters of different types.

Therefore a need exists to overcome the problems with the prior art as discussed above.

SUMMARY OF THE INVENTION

In one embodiment of the present invention a method for managing a plurality of network interfaces of varying types is disclosed. The method includes accepting a data packet at a pseudo network interface. The pseudo network interface manages a plurality of underlying physical network interfaces. The pseudo network interface selects selected physical network interface from the plurality of physical network interfaces for outputting the data packet. The data packet is modified to include a hardware address associated with the selected physical network interface in response to the selecting. The data packet that has been modified is forwarded to the physical network interface that has been selected.

In another embodiment, an information processing system for managing a plurality of network interfaces of varying types is disclosed. The information processing system includes a memory and a processor that is communicatively coupled to the memory. The information processing system also includes a networking environment. The networking environment includes a plurality of physical network interfaces. The network interfaces can be of the same type or of different types. The networking environment also includes a pseudo network interface coupled to the plurality of network interfaces. The pseudo network interface manages the plurality of physical network interfaces. The pseudo network interface is adapted to accept a data packet and select a selected physical network interface from the plurality of physical network interfaces for outputting the data packet. The networking environment is adapted to modify, in response to the physical network interface being selected, the data packet to include a hardware address associated with the selected physical network interface. The networking environment is also adapted to forward the data packet that has been modified to the physical network interface that has been selected.

In yet another embodiment, a computer readable medium for managing a plurality of network interfaces of varying types is disclosed. The computer readable medium comprises instructions for accepting a data packet at a pseudo network interface. The pseudo network interface manages a plurality of underlying physical network interfaces. The pseudo network interface selects a selected physical network interface from the plurality of physical network interfaces for outputting the data packet. The data packet is modified to include a hardware address associated with the selected physical network interface in response to the selecting. The data packet that has been modified is forwarded to the physical network interface that has been selected.

One advantage of the various embodiments of the present invention is the introduction of a Multi-Link (ML) interface, which is a processing layer within the communications processing of a communications node that is able to aggregate multiple network interfaces of similar or varying types into a single virtual interface. Another advantage is that the ML interface processing layer is able to be configured to manage address resolution for the network interfaces its selects for transmitting data packets. For example, in one embodiment, the ML interface can declare itself as NOARP, which means a hardware header is not included when packets are sent through the ML interface processing. Since a real interface driver does not perform the address resolution in such embodiments, the ML interface, after receiving a packet and adjudicating which underlying interface to use for its transmission, resolves the hardware header information on behalf of the real interface driver before passing the packet along for transmission. It should be noted that these operations performed by the ML interface are performed in a general, interface independent approach.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and other similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Multi-Link Networking Environment

Figure 1:
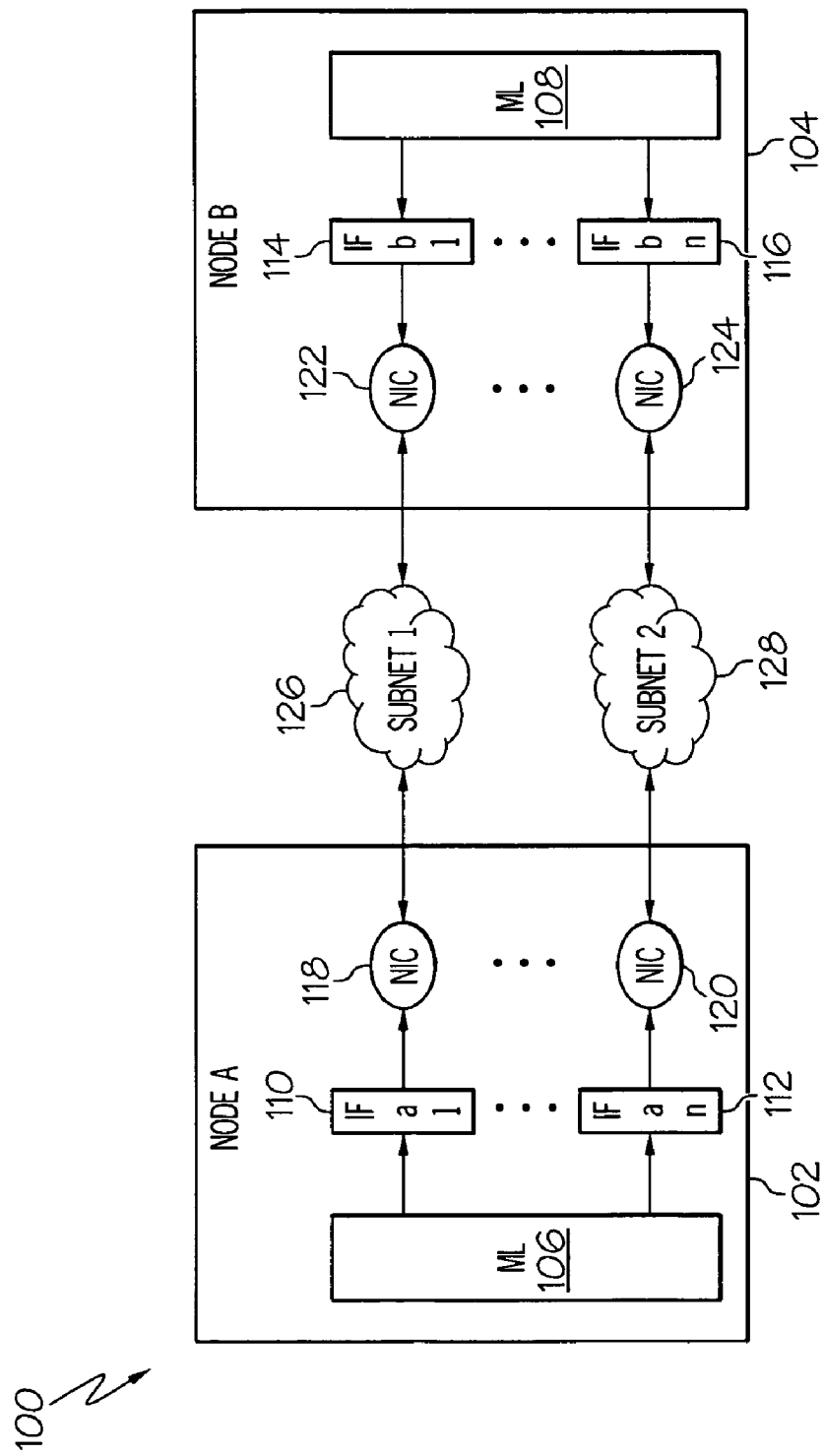
FIG. 1 is a block diagram illustrating a point-to-point communications implementation of an Multi-Link interface in a networking environment.

FIG. 1 is a block diagram illustrating a multi-link ("ML") networking environment 100. ML is a pseudo interface driver that, in one embodiment, is situated between the IP layer and data-link layer. Stated differently, the ML interface of one embodiment works on top of an actual physical interface driver(s) in the physical layer. The ML interface of one embodiment is able to bind a number of real network interfaces of various types through one virtual interface. Therefore, the ML interface provides fault tolerance, load balancing and link aggregation.

Another characteristic of an ML interface of one embodiment is that underlying physical interfaces are exposed to higher level processing layers. Unlike other technologies that hide physical interfaces, the ML interface of one embodiment leaves the physical interfaces visible. Each underlying interface still bears its own unique layer 2 and layer 3 addresses. This allows, for example, cluster management software to be able to see and manage the individual physical interfaces. The ML interface of one embodiment also allows applications that choose to directly use the physical interfaces to run concurrently. Yet another advantage of one embodiment of the present invention is that an ML interface is able to discover, maintain, and recover underlying routes between two end points. The ML interface of one embodiment does not rely on the physical device driver for the link status; instead such ML interfaces include a complete state machine that can quickly detect any end-to-end route change. The ML interface of one embodiment also does not require any special settings on a network switch.

FIG. 1 shows a point-to-point communications implementation 100 including a pair of nodes, Node A 102 and Node B 104, in accordance with one embodiment. When processing elements (not shown) of Node A 102 try to contact Node B 104 through the ML interface 106 via one or more subnets 126, 128, the ML interface 106 on Node A 102 broadcasts a route discovery request through each of its underlying interfaces—IF a1 110 through IF an 112 (which are all communicatively coupled to a Network Interface Controller ("NIC") 118, 120, 122, 124). When the ML interface 108 on Node B 104 receives the broadcast message from Node A 102, the ML interface 108 replies to Node A 102 through its underlying interfaces—IF b1 114 through IF bn 116. Upon receiving each reply, the ML interface 106 on Node A 102 establishes a valid route each of its physical interfaces 110, 112 and caches the route in its ML routing table (not shown).

The ML interface 106, 108 of one embodiment uses a timer (not shown) to maintain the route table in the following way. For every timer tick, the ML interface 106, 108 of one embodiment walks through its routing table and sends unicast keep-alive requests for all routes. Based on the replies back, the ML interface 106, 108 updates the status of each route. If the ML interface 106, 108 does not receive a reply for a certain number of consecutive probe requests, the ML interface 106, 108 declares the route "down" and excludes it from being used in communication. On the other hand, if the ML interface 106, 108 begins to receive replies for a route that was in "down" state, the ML interface 106, 108 marks the route as "up" and allows it to be used for communication again.

The various embodiments of the present invention utilize an ML interface in any suitable operating system environments such as (but not limited to) a Linux operating environment. As discussed above, current network interface technology is generally limited to interfacing with a single interface type such as Ethernet. This limitation holds true for the LINUX operating environment. However, in the various embodiments of the present invention, the ML interface implemented in a LINUX environment is used generally for any type of physical interconnect to achieve high network availability, reliability and performance.

In an operating environment such as LINUX, address resolution is done in the network layer/IP layer and not by interface drivers. For example, when a packet needs to be transferred over a real interface, the IP layer first looks up the route to the destination host in either a routing cache or its forwarding information data base. If the packet is for a non-local host, the IP layer resolves neighborhood information through an Address Resolution Protocol ("ARP") operation. Finally the packet is sent to the data-link layer output interface, which ultimately sends the packet out over the physical medium.

As discussed above, an ML interface driver of one embodiment is a pseudo interface driver and a physical adapter is not associated with it. Therefore, having the IP layer perform address resolution for the ML interface is not advantageous. Thus, an ML interface, in one embodiment, can declare itself as NOARP, which means when packets are sent down to it, a hardware packet header is not included. Since a real interface driver does not perform the address resolution, the ML interface, after receiving a packet and adjudicating which underlying interface to use for transmission, resolves the hardware header information on behalf of the real interface driver before passing the packet down. It should be noted that these operations performed by the ML interface are performed in a general, interface independent approach.

Figure 2:
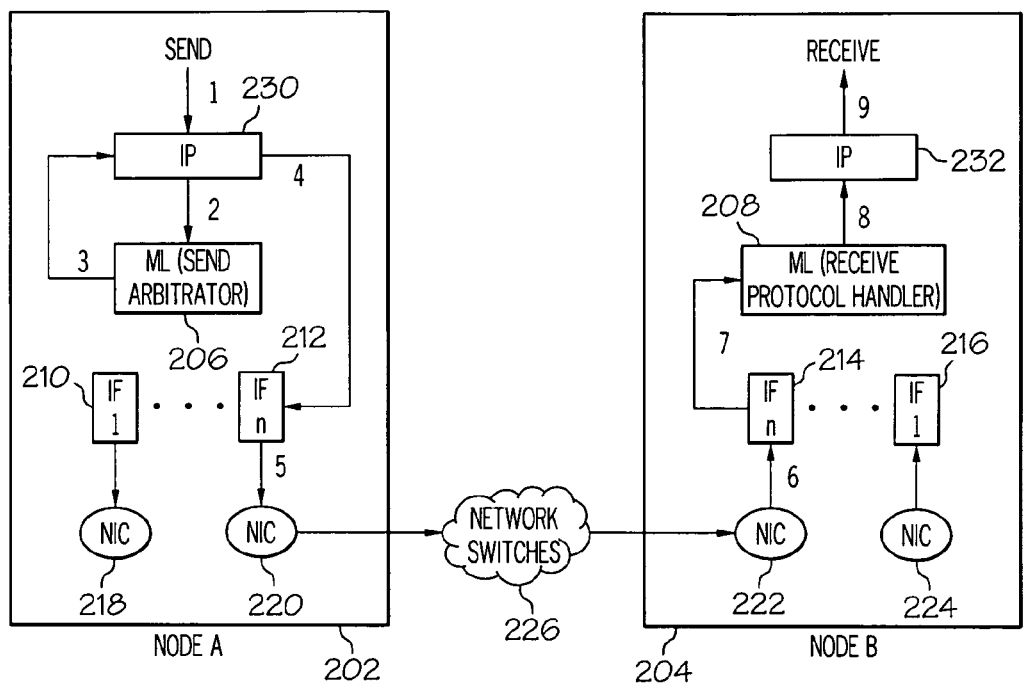
FIG. 2 is a block diagram illustrating one example of implementing a ML interface in a networking environment that includes multiple network interfaces of varying types according to one embodiment of the present invention.

FIG. 2 shows one embodiment for providing a general ML for a LINUX operating environment. In particular, the ML interface 206 of FIG. 2 receives a data packet from IP layer 230 and wraps that data packet in another IP header prior to passing it back to the IP layer 230 for address resolution. Similar to FIG. 1, FIG. 2 shows a plurality of nodes, Node A 202 and Node B 204. Each node 202, 204 includes multiple interface adapters IF 1 210 through IF n 212 of Node A 202 and IF n 214 through IF 1 216 of Node B 204 that are communicatively coupled to a respective ML interface 206, 208 and a respective NIC 218, 220, 222, 224. The NICs 218, 220, 222, 224 communicatively couple each node 202, 204 to one another via one or more network switches 226.

The ML interface 206, 208 of one embodiment registers a new protocol with the IP layer 230 when the ML interface 206, 208 is installed on the node 202, 204. This protocol informs the IP layer 230 to forward a data packet for transmission to another node to the ML interface 206, 208. At time T1, a data packet is received by the IP layer 230. In one embodiment, the data packet corresponds to data created by an application and subsequently sent to a transport layer (not shown). The transport layer encapsulates the data into a data packet and forwards the data packet to the IP layer 230 at time T1. The IP layer 230, at time T2, forwards the data packet to the ML interface 206. The ML interface 206 receives the data packet from the IP layer 230 and determines a physical (output) interface 210, 212 to associate with the data packet, i.e., determine which physical interface to use to send that packet to its destination. This determination can be accomplished in various ways. For example, the ML interface 206 can maintain a list of the underlying physical interfaces and select the first physical interface on the list. For each subsequent packet, the ML interface 206 selects the next physical interface on the list in a round robin format. In another embodiment, the ML interface 206 can select a physical interface based on a transport layer connection port number and/or a network layer protocol address that is associated with the data packet. In one embodiment the physical interface is selected using a hashing algorithm.

Once the ML interface 206 selects the physical interface for transmitting the data packet, it constructs a new IP header with the source and destination IP address of the selected route and a protocol set to the new protocol that the ML interface 206 registered with the IP layer 230. The ML interface layer 206 then adds that new IP header to the data packet. It should be noted that the new IP header is just a typical IP header with information associated with the physical interface selected by the ML interface 206 to be used to send that data packet. For example, if the ML interface 206 selects the physical interface N 212, the ML interface 206 creates a new IP header for the data packet to send that includes information associated with the physical interface N 212.

Figure 3:
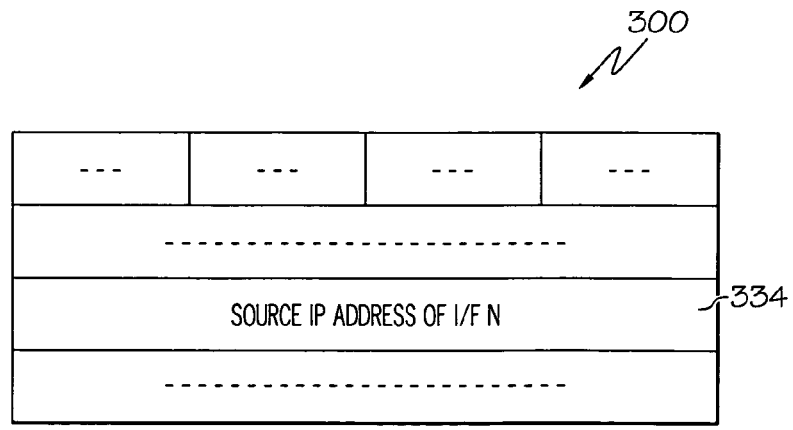
FIG. 3 illustrates contents of an IP header according to one embodiment of the present invention.

FIG. 3 shows one example of an IP header 300 that is constructed by the ML interface 306. The format of the IP header 300 utilized by one embodiment of the present invention conforms to a conventional IP header, as is familiar to one of ordinary skill in the relevant arts, with the exception that data contained in that IP header is determined and added though non-conventional processing. In order to more clearly describe this aspect of the present invention, only the aspects of the IP header relevant to one embodiment of the present invention are shown in FIG. 3. In particular, FIG. 3 shows an IP header 300 comprising the source IP address 334 of the selected physical interface, which is interface N 212 in this example. The IP header 300 also comprises additional information not shown, such as the destination IP address.

Returning to FIG. 2, once the ML interface 206 has constructed the new IP header 300, the ML interface 206, at time T3, adds the new IP header 300 to the data packet to be sent and returns that data packet, with the additional IP header 300, back to the IP layer 230. The IP layer 230 analyzes the IP header 300 and performs address resolution operations to determine the Media Access Control ("MAC") address of the selected physical interface 212. For example, the IP layer 230 uses the IP header 300 to identify the IP address of the selected physical interface 212 and subsequently determines the interface's MAC address. The IP layer 230, at time T4, sends out the data packet through the selected physical interface 212.

The physical interface 212, at time T5, communicates the data packet to its NIC 220, which in turn transmits the data packet to the destination node, Node B 204 in this example, via the network switch 226. The corresponding NIC 222 at Node B 204 receives the data packet and, at time T6, forwards the data packet to its physical interface 214. The ML interface 208 at the receiving node, Node B 204, has also registered its protocol with the IP layer 232 located at Node B 204. Therefore, when the physical interface 214 at Node B 206 receives the data packet, the ML interface 208 invokes it protocol handler. The physical interface 206, at time T7, forwards the data packet to the ML interface 208, which removes the extra IP header that was inserted by the sending ML interface 206 from the data packet. The ML interface 208, at time T8, delivers the data packet to the IP layer 232 for routine processing.

Figure 4:
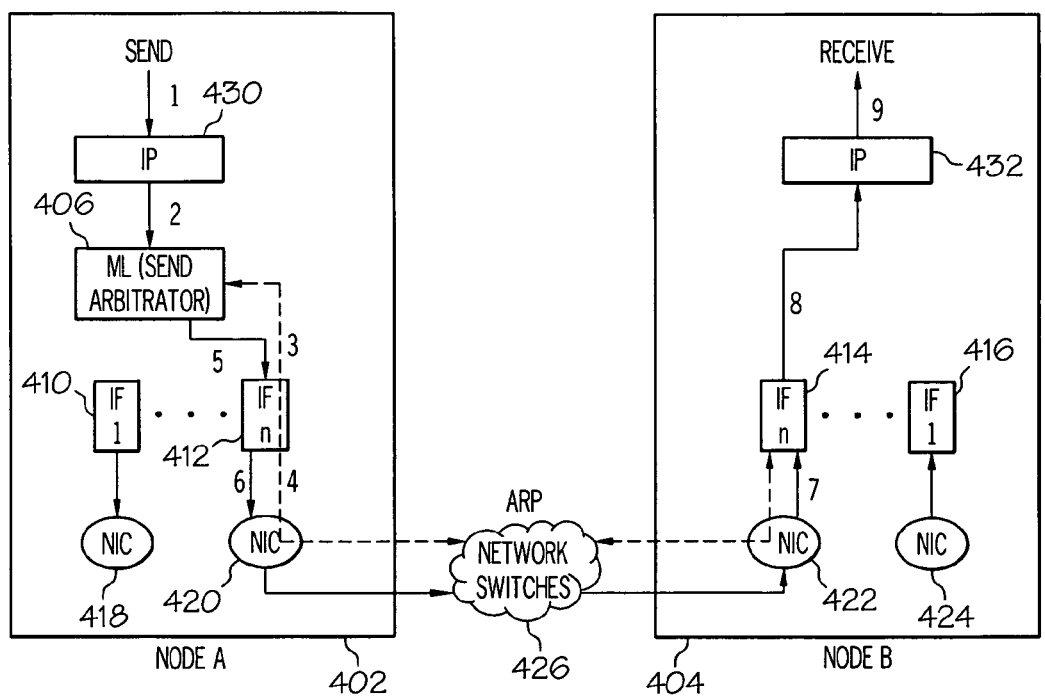
FIG. 4 is a block diagram illustrating an alternative example of implementing a ML interface in a networking environment that includes multiple network interfaces of varying types according to one embodiment of the present invention.

FIG. 4 illustrates an alternative embodiment for providing a general ML in, for example, a LINUX operating environment. The alternative embodiment of FIG. 4 illustrates the processing components used to send a data packet from one node, Node A 402, to another node, Node B 404. The processing components installed in each node, both Node A 402 and Node B 404, are symmetrical and a ML interface is also included in Node B 404. In order to more clearly describe the processing to send a packet from one node to another, however, only the processing components utilized for that data transfer are shown in FIG. 4. In the alternative embodiment of FIG. 4, the ML interface does not perform any processing on the node receiving the data packet, so the ML interface for Node B 404 is not shown in this example in order to more clearly describe the relevant aspects of the operation of this alternative embodiment.

Similar to FIG. 1 and FIG. 2, FIG. 4 shows a plurality of nodes, Node A 402 and Node B 404. Each node 402, 404 includes interface adapters 410, 412, 414, 416, which can be of different types, and a respective NIC 418, 420, 422, 424 that is associated with one of each of those interface adapters. The NICs 418, 420, 422, 424 communicatively couple each node 402, 404 to one another via one or more network switches 426. The interface adapters of the sending node, Node A 402, in FIG. 4 are also communicatively coupled to an ML interface 406.

An ML interface is also installed on Node B 404 to support transmission of data packets from Node B 404, but no processing is performed by the ML interface of this alternative embodiment when a data packet is received. At time T1, a data packet to be transmitted is received by the IP layer 430. In one embodiment, the data packet corresponds to data created by an application and subsequently sent to a transport layer (not shown). The transport layer encapsulates the data into a data packet and forwards, at time T1, the data packet to the IP layer 430. The IP layer 430, at time T2, forwards the data packet to the ML interface 406. The ML interface 406 receives the data packet from the IP layer 430 and determines a physical (output) interface such as interface N 412 for transmitting the data packet. In one embodiment, the physical interface is selected by the ML interface 406 in a manner discussed above.

When the ML interface 406 receives the data packet to be transmitted, it determines that the only information missing in the data packet is the data-link layer header. Therefore, instead of letting the packet traverse the whole extra IP layer, the ML interface 406 of this alternative embodiment performs one or more neighbor discovery operations for other nodes connected to Node A 402 by employing a set of neighbor discovery functions. For example, after the ML interface 406 receives the data packet to be sent and makes a decision on which output interface is to be used to send that data packet, the ML interface 406 analyzes a kernel ARP table with the first hop IP address, wherein the first hop is Node B 404 in this example. The ARP table comprises, among other things, MAC addresses for the destination nodes.

If an entry is found for a path to the destination node and that entry indicates that the path is in a valid state, the ML interface 406 retrieves the MAC address for the destination node of the first hop. The ML interface 406 then constructs a hardware header for the data packet using the identified MAC address as the destination MAC address. However, if an entry for a path to the destination node is not found or an entry for a path to the destination node is found but is in an invalid state, the ML interface 406 queues the packet into a neighbor structure's arp_queue. The neighbor structure is the structure in the kernel that stores the information for the neighbor node. Also, for any packet, if the address cannot be resolved, a neighbor protocol places the packet into the arp_queue. If the address is resolved in a certain time period, the packet is dequeued and transmitted. If the address is not resolved within a certain time period, the packet is dropped. In this embodiment, the ML interface 406, acts like a neighbor protocol in putting the packet in the arp_queue when it cannot resolve the address. The ML interface 406, at time T3, sends out an ARP request onto the network. The ARP request includes, among other things, the IP address associated with the destination of the data packet.

Node B 404, in this example, receives the ARP request and sends an ARP reply comprising the MAC address of the physical interface associated with the IP address in the ARP request. The ML interface 404, at time T4, receives the ARP reply and either caches the new ARP entry or updates the entry state (e.g., valid or invalid) before sending out the packets in the arp_queue. Once the MAC address is determined for the destination, the ML interface 406, at time T5, forwards the data packet onto the appropriate physical interface 412. The physical interface 412, at time T6, passes the data packet to its NIC 420 which sends the packet to Node B 404 via the network switch 426. The NIC 422 of the physical interface 414 at Node B 404 receives the data packet and, at time T7, passes the packet to the physical interface 414. The physical interface 414, at time T8, forwards the packet to the IP layer 432 for processing. It should be noted that this alternative embodiment does not require any changes to the receiving node. With respect to the receiving node, the data packets in this alternative embodiment are not required to go through the extra IP layer processing as discussed with respect to FIG. 2. Therefore, the alternative embodiment of FIG. 4 can provide a higher throughput than the embodiment of FIG. 2.

Information Processing Node

Figure 5:
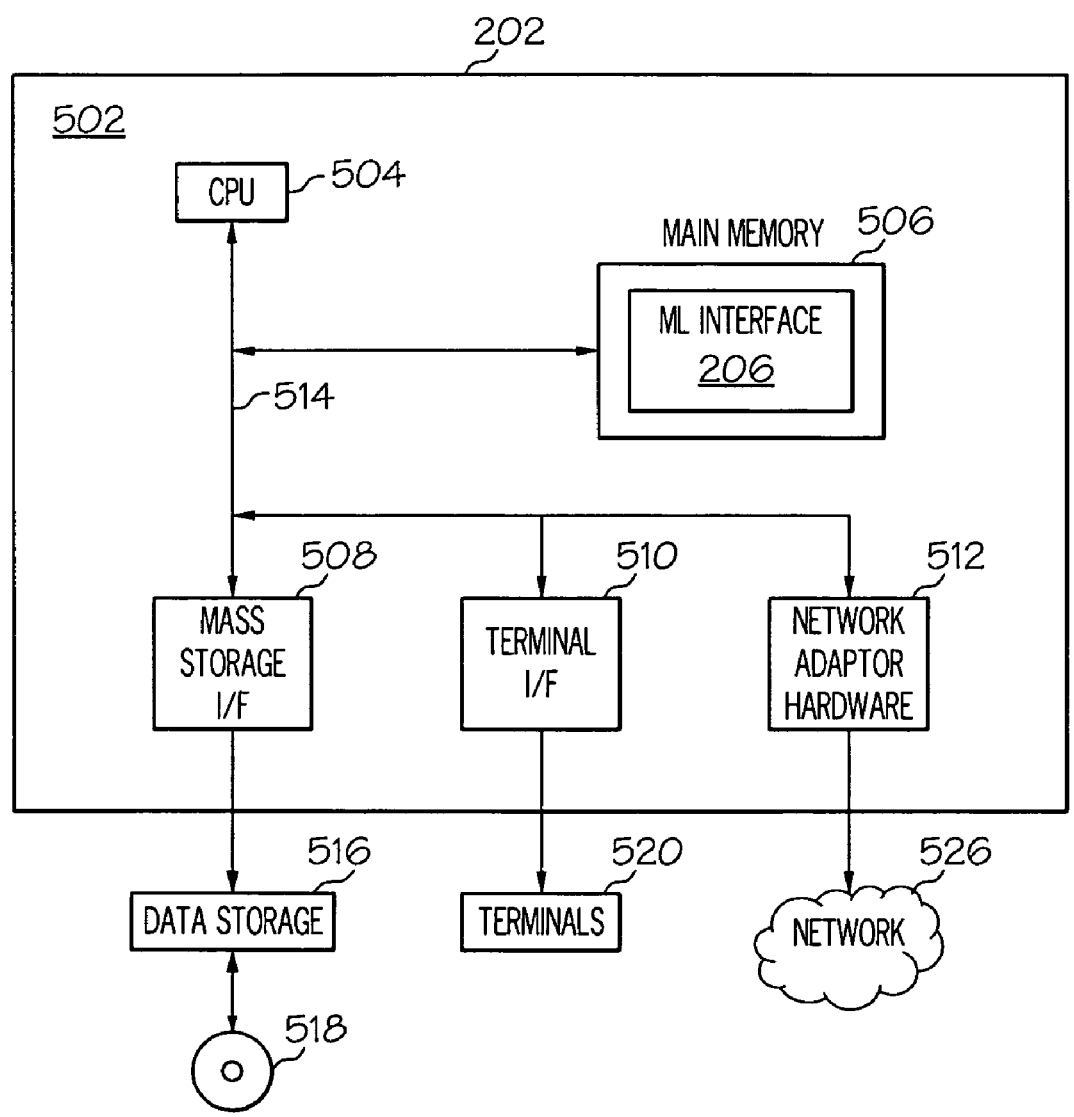
FIG. 5 is a block diagram illustrating a detailed view of an information processing node according to one embodiment of the present invention.

FIG. 5 is a block diagram illustrating a more detailed view of an information processing node, such as information processing Node A 202 of FIG. 2, according to one embodiment of the present invention. It should be noted that the information processing node 500 can be (but is not limited to) a server, a desktop computer, a notebook computer, or a personal digital assistant.

The information processing node 500 includes a computer 502. The computer 502 has a processor 504 that is connected to a main memory 506, mass storage interface 508, terminal interface 510, and network adapter hardware 512. A system bus 514 interconnects these system components. The mass storage interface 508 is used to connect mass storage devices, such as data storage device 516, to the information processing system 102. One specific type of data storage device is a computer readable medium reader, such as an optical disk drive, which may be used to read a computer readable medium, such a CD 518 or DVD (not shown) that is encoded with a program. Another type of data storage device is a data storage device configured to support, for example, Linux ext2 file system operations.

The main memory 506, in one embodiment, includes the ML interface 206 discussed above. Although illustrated as concurrently resident in the main memory 506, it is clear that respective components of the main memory 506 are not required to be completely resident in the main memory 506 at all times or even at the same time. In one embodiment, the information processing node 500 utilizes conventional virtual addressing mechanisms to allow programs to behave as if they have access to a large, single storage entity, referred to herein as a computer system memory, instead of access to multiple, smaller storage entities such as the main memory 506 and data storage device 516. Note that the term "computer system memory" is used herein to generically refer to the entire virtual memory of the information processing system 500.

Although only one CPU 504 is illustrated for computer 502, computer systems with multiple CPUs can be used equally effectively. Various embodiments of the present invention further incorporate interfaces that each includes separate, fully programmed microprocessors that are used to off-load processing from the CPU 504. Terminal interface 510 is used to directly connect one or more terminals 520 to computer 502 to provide a user interface to the computer 502. These terminals 520, which are able to be non-intelligent or fully programmable workstations, are used to allow system administrators and users to communicate with the information processing system 500. The terminal 520 is also able to consist of user interface and peripheral devices that are connected to computer 502 and controlled by terminal interface hardware included in the terminal I/F 510 that includes video adapters and interfaces for keyboards, pointing devices, and other devices/interfaces.

An operating system (not shown) included in the main memory is a suitable multitasking operating system such as (but not limited to) the Linux, UNIX, Windows XP, and Windows Server 2001 operating system. Various embodiments of the present invention are able to use any other suitable operating system. Some embodiments of the present invention utilize architectures, such as an object oriented framework mechanism, that allow instructions of the components of operating system (not shown) to be executed on any processor located within the information processing system 500. The network adapter hardware 512 is used to provide an interface to a network 526. Various embodiments of the present invention can be adapted to work with any data communications connections including present day analog and/or digital techniques or via a future networking mechanism.

Although the embodiments of the present invention are described in the context of a fully functional computer system, those skilled in the art will appreciate that various embodiments are capable of being distributed as a program product via CD or DVD, e.g. CD 518, CD ROM, or other form of recordable media, or via any type of electronic transmission mechanism.

Operation Flow for Providing a Multi-Link Interface in a Networking Environment

Figure 6:
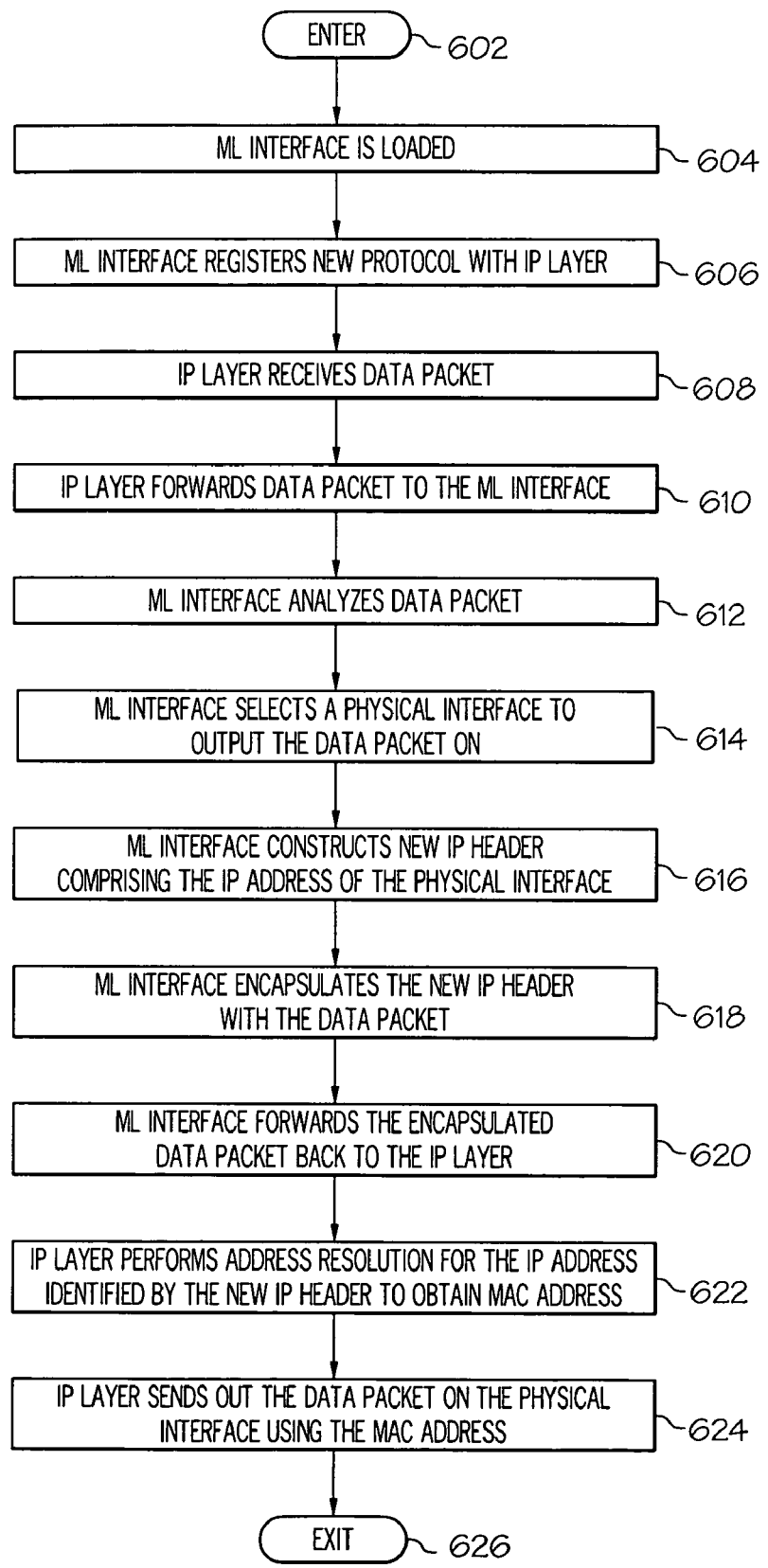
FIG. 6 is an operational flow diagram illustrating one process of providing an ML interface in a networking environment that includes multiple physical interfaces of varying types according to the embodiment of FIG. 2.

FIG. 6 is an operational flow diagram illustrating a process of providing an ML interface in a networking environment including multiple physical interfaces, according to one embodiment of the present invention. The operational flow diagram of FIG. 6 begins at step 602 and flows directly to step 604. An ML interface 206, at step 604, is loaded onto an information processing node 202. The ML interface 206, at step 606, registers a new protocol with the IP Layer 230 to inform the IP layer 230 to forward data packets to the ML interface 206.

The IP layer 230, at step 608, receives a data packet and forwards the packet to the ML interface 206 at step 610. The ML interface 206, at step 612, analyzes the data packet and selects a physical interface 220 for outputting the data packet at step 614. Examples of ways to select a physical interface for a particular packet are discussed above. The ML interface 206, at step 616, constructs a new IP header for the data packet. This new IP header includes the IP address associated with the physical interface 220 through which the data packet is to be sent from this node, i.e., the originating node.

The ML interface 206, at step 618, encapsulates the new IP header with the data packet and forwards the encapsulated data packet back to the IP layer 230 at step 620. The IP layer 230, at step 622, performs an address resolution operation on the IP address in the new IP header to obtain the MAC address for the selected physical interface 220 of the originating node through which the data packet will be sent. The IP layer 230, at step 624, sends out the data packet on the physical interface 220 using the MAC address. The control flow then exits at step 626.

Operation Flow for Multi-Link Interface Management of a Received Data Packet

Figure 7:
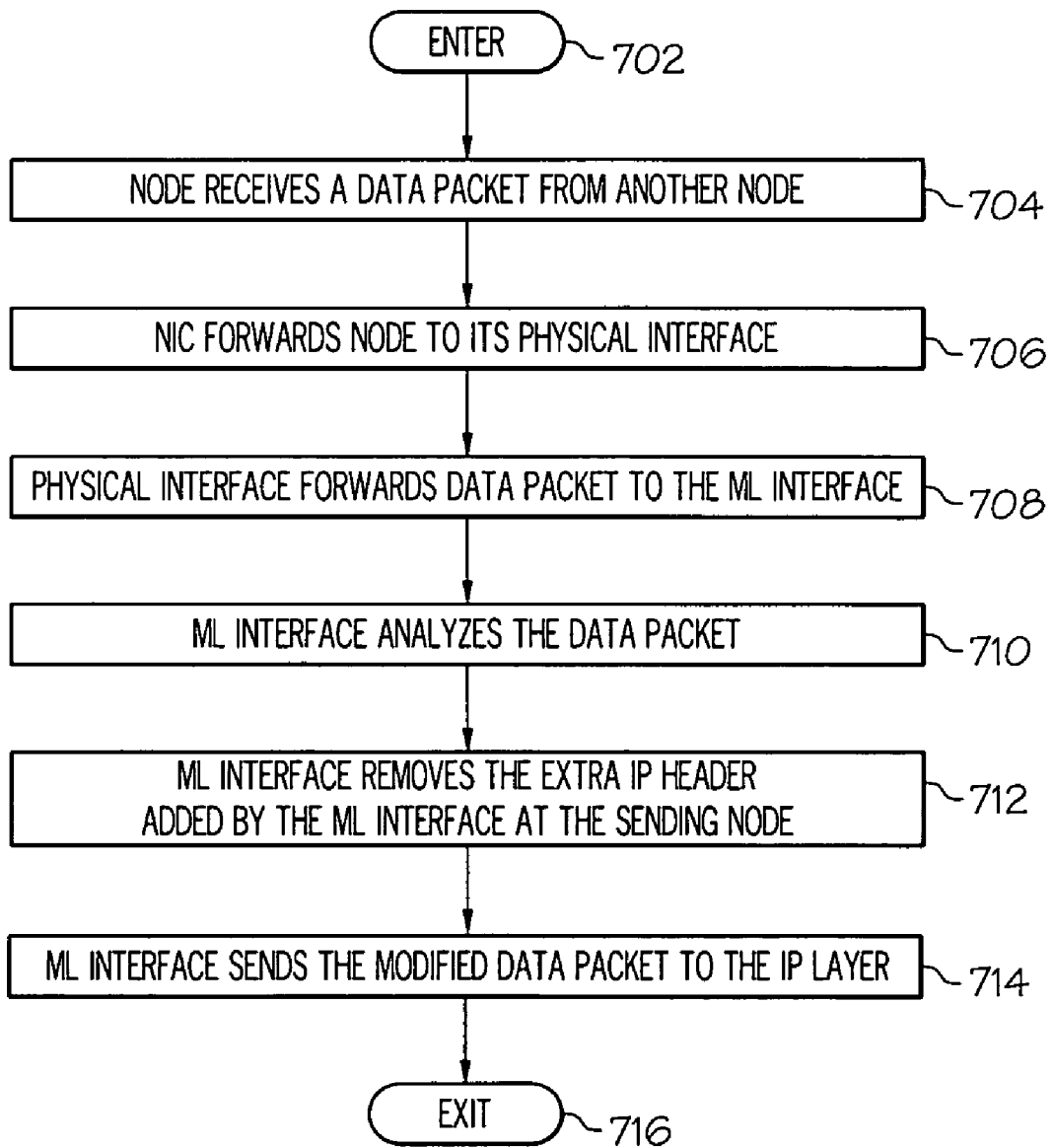
FIG. 7 is an operational flow diagram illustrating one process of managing received data packets by an ML interface according to the embodiment of FIG. 2.

FIG. 7 is an operational flow diagram illustrating a process of managing received data packets by an ML interface according to one embodiment of the present invention. The operational flow diagram of FIG. 7 begins at step 702 and flows directly to step 704. A node 204, at step 704, receives a data packet from another node 202 that includes an ML interface 206. The NIC 222, at step 706, forwards the data packet to its physical interface 214. The physical interface 214, at step 708, forwards the data packet to the ML interface 208. The ML interface 208, at step 710, analyzes the data packet. The ML interface 208, at step 712, removes the extra IP header added by the ML interface 206 of the sending node 204. The ML interface 208, at step 714, sends the data packet to the IP layer 230 for conventional processing by that IP layer 230. The control flow then exits at step 716.

Figure 8:
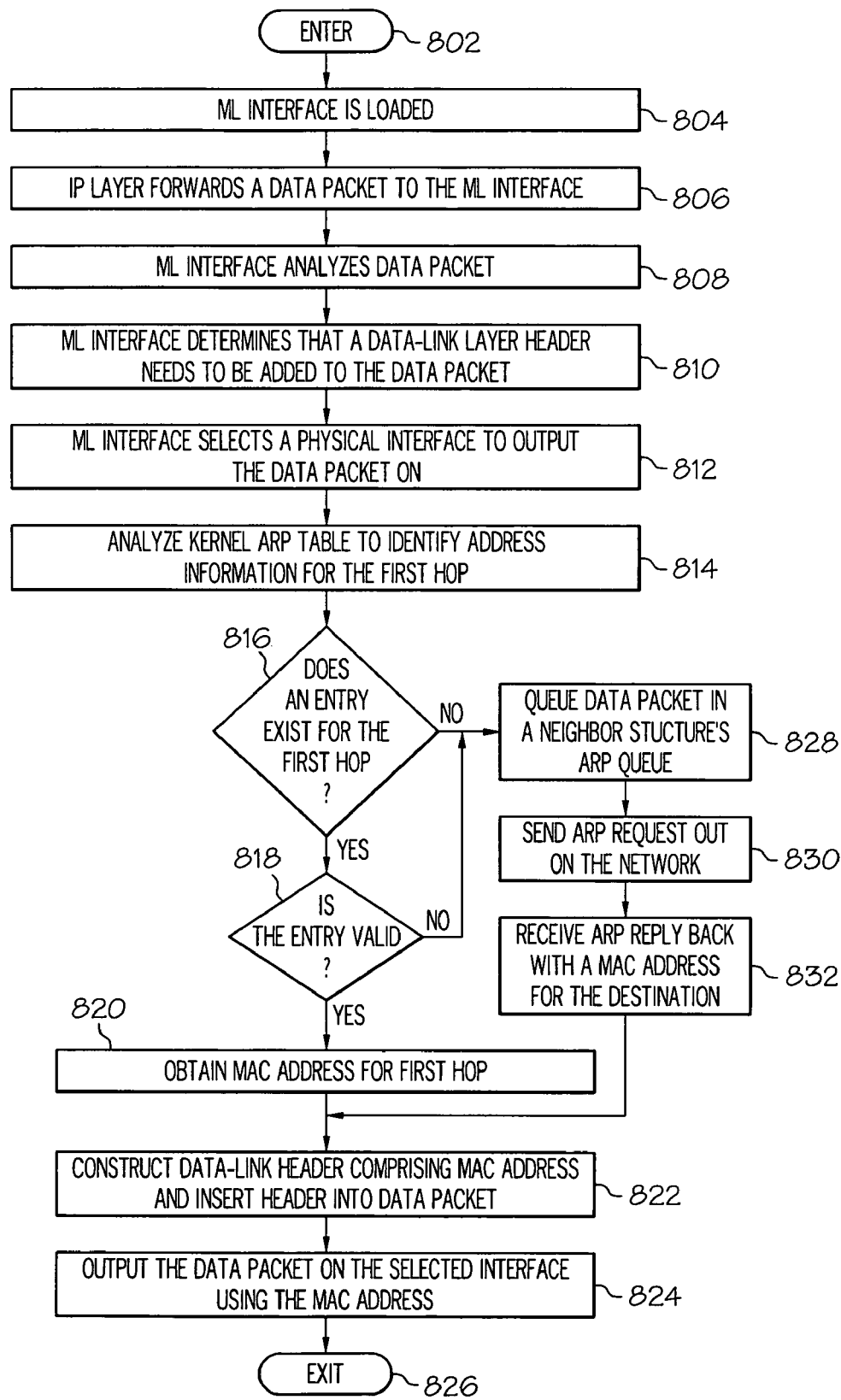
FIG. 8 is an operational flow diagram illustrating another process of providing an ML interface in a networking environment that includes multiple physical interfaces of varying types according to the embodiment of FIG. 4.

Another Operation Flow for Providing a Multi-Link Interface in a Networking Environment FIG. 8 is an operational flow diagram illustrating an alternative process of providing an ML interface in a networking environment including multiple physical interfaces. The operational flow diagram of FIG. 8 begins at step 802 and flows directly to step 804. An ML interface 206, at step 804, is loaded onto an information processing node 202. The IP layer 230, at step 806, forwards a data packet to the ML interface 206. The ML interface 206, at step 808, analyzes the data packet and determines that a data-link header needs to be added to the data packet, at step 810, since the ML interface 206 interface is configured as NOARP thereby causing the packet to be received without the data-link header. The ML interface 206, at step 812, selects a physical interface for outputting the data packet. The ML interface 206, at step 814, analyzes a kernel ARP table to identify address information for the first hop. The ML interface 206, at step 816, determines if an entry exists in the ARP table for the first hop. If the result of this determination is positive, the ML interface 206, at step 818, determines if the entry is valid. If the result of this determination is negative, the control flows to step 828. If the result of this determination is positive, the ML interface 206, at step 820, obtains the MAC address for the first hop from the ARP table.

The ML interface 206, at step 822, constructs a data-link layer header that includes the MAC address of the first hop destination and inserts this header into the data packet. The ML interface 206, at step 824, outputs the data packet on the selected physical interface 214 using the MAC address. The control flow then exits at step 826.

Returning to step 816, if the result of this determination is negative, the ML interface 206, at step 828, queues the data packet in a neighbor structure's ARP queue. The ML interface 206, at step 830, sends an ARP request out on the network.

The ML interface 206, at step 832, receives an ARP reply back with a MAC address for the destination. The control flow returns to step 822 where the ML interface 206 constructs a data-link layer header that includes the MAC address of the destination and inserts this header into the data packet. The ML interface 206, at step 824, outputs the data packet on the selected physical interface 214 using the MAC address. The control flow then exits at step 826.

Non-Limiting Examples

The present invention can be realized in hardware, software, or a combination of hardware and software. A system according to one embodiment of the invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for managing a plurality of physical network interfaces within a computer system, the method comprising:
accepting a data packet at a multi-link interface that manages the plurality of physical network interfaces, from an IP layer of the computer system;
selecting, by the multi-link interface, a particular physical network interface from the plurality of physical network interfaces for outputting the data packet;
modifying, in response to the selecting, the data packet to include a first IP address of the particular physical network interface, by encapsulating the data packet in a new IP header including the first IP address and a second IP address identifying a destination node that is to receive the data packet, to form a modified data packet;
forwarding the modified data packet to the particular physical network interface, by returning the modified data packet to the IP layer, wherein the IP layer routes the modified data packet to the particular physical network interface by resolving the first IP address to obtain the media access control (MAC) address of the particular physical network interface; and
transmitting the modified data packet from the particular physical network interface to the destination node.

2. The method of claim 1, further comprising registering, with the IP layer of the computer system, a new protocol for handling the modified data packet, wherein the multi-link interface is registered as the handler for the new protocol, wherein the modifying further modifies the data packet to include a protocol identifier for the new protocol.

3. The method of claim 2, further comprising:
responsive to the transmitting, receiving the modified data packet at the destination node; and
forwarding the modified data packet from a physical interface of the destination node, to another multi-link interface executing within the destination node.

4. The method of claim 3, further comprising un-encapsulating the data packet from the modified data packet by the another multi-link interface.

5. A computer system including at least one processor, at least one corresponding memory coupled to the at least one processor, and a plurality of physical network interfaces coupled to the at least one processor, wherein the memory stores program instructions for execution by the at least one processor, wherein the program instructions comprise program instructions for:
accepting a data packet at a multi-link interface that manages the plurality of physical network interfaces, from an IP layer of the computer system;
selecting, by the multi-link interface, a particular physical network interface from the plurality of physical network interfaces for outputting the data packet;
modifying, in response to the selecting, the data packet to include a first IP address of the particular physical network interface, by encapsulating the data packet in a new IP header including the first IP address and a second IP address identifying a destination node that is to receive the data packet, to form a modified data packet;
forwarding the modified data packet to the particular physical network interface, by returning the modified data packet to the IP layer, wherein the IP layer routes the modified data packet to the particular physical network interface by resolving the first IP address to obtain the media access control (MAC) address of the particular physical network interface; and
transmitting the modified data packet from the particular physical network interface to the destination node.

6. The computer system of claim 5, wherein the program instructions further comprise program instructions for registering, with the IP layer of the computer system, a new protocol for handling the modified data packet, wherein the multi-link interface is registered as the handler for the new protocol, wherein the program instructions for modifying further modify the data packet to include a protocol identifier for the new protocol.

7. The computer system of claim 6, wherein the program instructions further comprise program instructions for:
responsive to a second modified packet being transmitted by another node, receiving the second modified data packet at another physical network interface, which may be the same as or different from the particular physical network interface, of the plurality of physical network interfaces; and
forwarding the second modified data packet from the another physical network interface, to the multi-link interface.

8. The computer system of claim 7, wherein the program instructions further comprise program instructions for un-encapsulating a second data packet from the second modified data packet by the multi-link interface.

9. A computer program product comprising a tangible non-transitory computer-readable storage medium storing program instructions for execution by a processor within a computer system including a plurality of physical network interfaces, wherein the program instructions comprise program instructions for:
accepting a data packet at a multi-link interface that manages the plurality of physical network interfaces, from an IP layer of the computer system;
selecting, by the multi-link interface, a particular physical network interface from the plurality of physical network interfaces for outputting the data packet;
modifying, in response to the selecting, the data packet to include a first IP address of the particular physical network interface, by encapsulating the data packet in a new IP header including the first IP address and a second IP address identifying a destination node that is to receive the data packet, to form a modified data packet;
forwarding the modified data packet to the particular physical network interface, by returning the modified data packet to the IP layer, wherein the IP layer routes the modified data packet to the particular physical network interface by resolving the first IP address to obtain the media access control (MAC) address of the particular physical network interface; and
transmitting the modified data packet from the particular physical network interface to the destination node.

10. The computer program product of claim 9, wherein the program instructions further comprise program instructions for registering, with the IP layer of the computer system, a new protocol for handling the modified data packet, wherein the multi-link interface is registered as the handler for the new protocol, wherein the program instructions for modifying further modify the data packet to include a protocol identifier for the new protocol.

11. The computer program product of claim 10, wherein the program instructions further comprise program instructions for:
responsive to a second modified packet being transmitted by another node, receiving the second modified data packet at another physical network interface, which may be the same as or different from the particular physical network interface, of the plurality of physical network interfaces; and forwarding the second modified data packet from the another physical network interface, to the multi-link interface.

12. The computer program product of claim 11, wherein the program instructions further comprise program instructions for un-encapsulating a second data packet from the second modified data packet by the multi-link interface.

* * * * *